(12) United States Patent
Shiraishi

(10) Patent No.: US 10,664,210 B2
(45) Date of Patent: May 26, 2020

(54) RECEIPT PRINTER AND INFORMATION PROCESSING METHOD

(71) Applicant: TOSHIBA TEC KABUSHIKI KAISHA, Tokyo (JP)

(72) Inventor: Norihisa Shiraishi, Numazu Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/271,465

(22) Filed: Feb. 8, 2019

(65) Prior Publication Data

US 2019/0258434 A1 Aug. 22, 2019

(30) Foreign Application Priority Data

Feb. 21, 2018 (JP) .................... 2018-028829

(51) Int. Cl.
*H04N 1/00* (2006.01)
*G06F 3/12* (2006.01)
*G06Q 20/20* (2012.01)

(52) U.S. Cl.
CPC .......... *G06F 3/1243* (2013.01); *G06F 3/1219* (2013.01); *G06F 3/1274* (2013.01); *G06F 3/1284* (2013.01); *G06Q 20/209* (2013.01)

(58) Field of Classification Search
CPC .... G06F 3/1243; G06F 3/1219; G06F 3/1274; G06F 3/1284; G06Q 20/209
USPC .......................................... 358/1.15
See application file for complete search history.

(56) References Cited

U.S. PATENT DOCUMENTS

| | | | |
|---|---|---|---|
| 6,189,781 B1 | 2/2001 | Yoshinaga et al. | |
| 2011/0004530 A1* | 1/2011 | Miyagawa | G06Q 20/209 705/24 |
| 2018/0032483 A1* | 2/2018 | Omiya | G06F 17/212 |

\* cited by examiner

*Primary Examiner* — Saeid Ebrahimi Dehkordy
(74) *Attorney, Agent, or Firm* — Kim & Stewart LLP

(57) ABSTRACT

A receipt printer includes a printing device, a communication interface configured to receive print data, and a processor. The processor is configured to generate text receipt data representative of text data included in the print data received by the communication interface, generate code symbol data corresponding to an optically-readable code symbol indicative of the text receipt data, based on the text receipt data, and control the printing device to print a receipt image on a receipt sheet based on the print data received by the communication interface and the optically-readable code symbol based on the code symbol data.

20 Claims, 4 Drawing Sheets

┌─────────────────────────────────────────────────────────┐
│                                                         │
│  OOO MART  OSAKI BRANCH STORE                           │
│                                                         │
│  OPEN TIME:9:30~21:00                                   │
│                                                         │
│  TEL:0120-XXX-XXX                                       │
│                                                         │
│  OSAKI BRANCH STORE 0120-XXX-XXX                        │
│                                                         │
│  14:30 30TH SEPTEMBER, 2017 (SATURDAY)   REGISTER 0001  │
│                                                         │
│  STACK NO.000000001     YAMADA TARO                     │
│                                                         │
│  GREEN PEPPER                                   ¥ 110   │
│                                                         │
│  MAY QUEEN                                      ¥ 190   │
│                                                         │
│  CARROT                                          ¥ 98   │
│                                                         │
│  LETTUCE                                        ¥ 258   │
│                                                         │
│  SUBTOTAL                                       ¥ 672   │
│                                                         │
│  DEPOSIT                                      ¥ 1,000   │
│                                                         │
│  CHANGE                                         ¥ 328   │
│                                                         │
└─────────────────────────────────────────────────────────┘
```

// # RECEIPT PRINTER AND INFORMATION PROCESSING METHOD

CROSS-REFERENCE TO RELATED APPLICATION

This application is based upon and claims the benefit of priority from Japanese Patent Application No. 2018-028829, filed on Feb. 21, 2018, the entire contents of which are incorporated herein by reference.

FIELD

Embodiments described herein relate generally to a receipt printer and an information processing method.

BACKGROUND

In a conventional electronic receipt system, an electronic receipt server manages electronic receipt data obtained by converting information that is to be printed on a paper receipt or the like to electronic data. Then, by accessing the electronic receipt server using an information terminal, same information as that supposed to be printed on the paper receipt can be browsed through the information terminal.

In such an electronic receipt system, the electronic receipt server may be necessary. Also, it may be necessary to replace a conventional device such as a POS (point-of-sale) terminal for issuing the paper receipt with a device having a function of providing the electronic receipt data to the electronic receipt server. For these reasons, an introduction cost of the system may increase. Therefore, it is desirable to provide an electronic receipt service at a lower cost.

DESCRIPTION OF THE DRAWINGS

FIG. 4 is a diagram illustrating an example of a screen displayed on a display device of an information terminal when a code symbol is read.

DETAILED DESCRIPTION

According to an embodiment, a receipt printer includes a printing device, a communication interface configured to receive print data, and a processor. The processor is configured to generate text receipt data representative of text data included in the print data received by the communication interface, generate code symbol data corresponding to an optically-readable code symbol indicative of the text receipt data, based on the text receipt data, and control the printing device to print a receipt image on a receipt sheet based on the print data received by the communication interface and the optically-readable code symbol based on the code symbol data.

An embodiment is described below with reference to the accompanying drawings.

Figure 1:
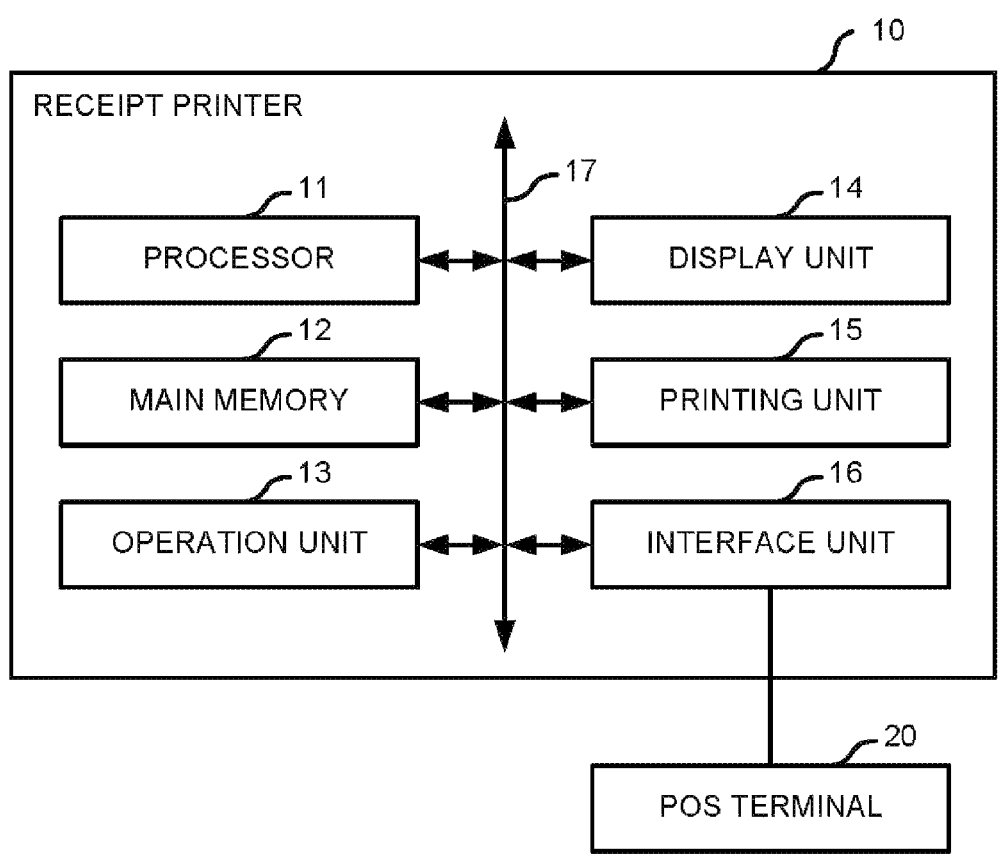
FIG. 1 is a block diagram illustrating a circuit configuration of main portions of a receipt printer according to an embodiment.

FIG. 1 is a block diagram illustrating a circuit configuration of main portions of a receipt printer 10 according to an embodiment.

The receipt printer 10 is used by being connected to a POS terminal 20, and issues a paper receipt in response to a printing request from the POS terminal 20.

The receipt printer 10 includes a processor 11, a main memory 12, an operation unit 13, a display unit 14, a printing unit 15, an interface unit 16 and a transmission path 17. The processor 11, the main memory 12, the operation unit 13, the display unit 14, the printing unit 15 and the interface unit 16 are connected to each other via the transmission path 17.

In the receipt printer 10, the processor 11 and the main memory 12 are connected to each other via the transmission path 17 and serve as a computer that performs an information processing for controlling the receipt printer 10. The receipt printer 10 may further include an auxiliary storage unit connected to the transmission path 17, and the above computer may include the auxiliary storage unit as an auxiliary storage portion. The auxiliary storage unit may be, for example, an EEPROM (electric erasable programmable read-only memory). The auxiliary storage unit may also be an HDD (hard disc drive) or an SSD (solid state drive).

The processor 11 acts as a central functional module of the computer. The processor 11 controls each functional module to perform various functions of the receipt printer by executing an operating system, a firmware, and application programs.

The main memory 12 acts as main memory of the above computer. The main memory 12 includes a nonvolatile memory area and a volatile memory area. The main memory 12 stores the operating system, the firmware, and the application programs in the nonvolatile memory area. The main memory 12 may store data necessary for the processor 11 to execute processing to control each functional module in the nonvolatile or volatile memory area. The main memory 12 uses the volatile memory area as a work area where data is appropriately rewritten by the processor 11.

The operation unit 13 inputs an operation performed by an operator. The operation unit 13 may appropriately include various operation devices such as a touch panel, a keyboard, or a key switch.

The display unit 14 performs a display for providing various kinds of information to the operator. The display unit 14 may appropriately include various display devices such as a touch panel, a LED (Light Emitting Diode) lamp, or a liquid crystal display panel.

The printing unit 15 prints any image on the receipt paper in response to an instruction from the processor 11.

The interface unit 16 is connected to the POS terminal 20, for example, via a communication cable. The interface unit 16 transmits and receives various kinds of data to and from the POS terminal 20. The interface unit 16 may be an existing device conforming to a well-known standard such as USB (universal serial bus).

The transmission path 17 includes an address bus, a data bus, a control signal line, and the like, and transmits data and control signals transmitted and received between the connected units.

Next, an operation performed by the receipt printer 10 configured as described above is described.

When the receipt printer 10 is in an operation state in which a receipt is issued in response to a request from the POS terminal 20, the processor 11 executes information processing described below by executing the firmware or the application program stored in the main memory 12. In other words, the firmware or the application program for performing the information processing described below is an information processing program for enabling the above computer to perform various functions described below.

Figure 2:
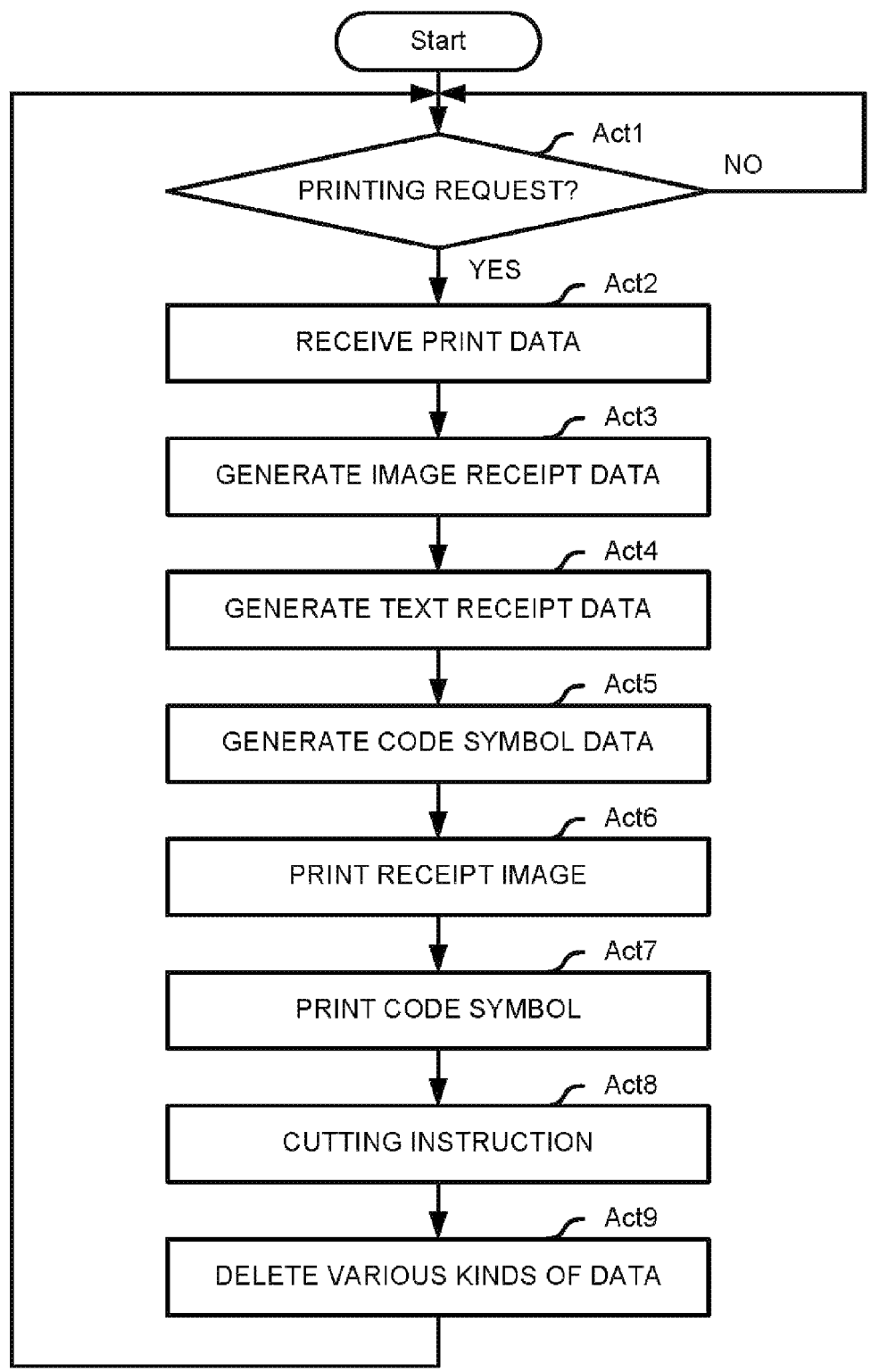
FIG. 2 is a flowchart depicting information processing executed by a processor in FIG. 1.

FIG. 2 is a flowchart depicting information processing executed by the processor 11.

In Act 1, the processor 11 stands by until a printing request is received from the POS terminal 20. Then, if the printing request from the POS terminal 20 is received, the processor 11 determines Yes and the process proceeds to Act 2.

In Act 2, the processor 11 receives the print data transmitted from the POS terminal 20 using the interface unit 16. The print data includes text data and image data respectively indicating character strings and images to be shown on a receipt. The character string to be shown on the receipt may include a store name, a store location, a store phone number, a transaction date and time, a commodity name, a unit price, a discount amount, a total amount, a consumption tax amount, the quantity of commodities, a settlement method and the like. The image indicated by the image data may include an image contained in the receipt, such as a store logo, advertisement, or the like. The print data may include any text data and any image data. The processor 11 stores the received print data in the main memory 12. By executing the information processing shown in FIG. 2 by the processor 11, the computer having the processor as the central functional module functions as an acquisition module.

In Act 3, the processor 11 generates image receipt data including various character strings and images indicated by the print data and indicating a receipt image to be printed on the receipt paper. The processor 11 stores the generated image receipt data in the main memory 12.

In Act 4, the processor 11 generates text receipt data. Specifically, the processor 11 extracts character strings from the print data, and processes the character strings according to a predetermined format such as CSV (comma separated values) format to generate the text receipt data. For example, the processor 11 extracts all the character strings indicated by the print data. However, the processor may extract only a character string relating to a predetermined item excluding some items such as the store location or the like. Specifically, the text receipt data is electronic receipt data including text data relating to a predetermined character string among character strings shown on the receipt without including the image data. The processor 11 stores the generated text receipt data in the main memory 12. By executing the information processing shown in FIG. 2 by the processor 11, the computer having the processor 11 as the central portion functions as a generation module.

In Act 5, the processor 11 generates data relating to a code symbol (hereinafter, referred to as code symbol data) indicating the text receipt data generated in Act 2 in accordance with a predetermined standard. Although any code symbol standard may be used, it is assumed that a QR Code® is used here.

In Act 6, the processor 11 controls the printing unit 15 to print a receipt image indicated by the image receipt data generated in Act 3 on the receipt paper. By executing the information processing shown in FIG. 2 by the processor 11, the computer having the processor 11 as the central functional module functions as a first control module.

In Act 7, the processor 11 continues to control the printing unit 15 to print a code symbol indicated by the code symbol data generated in Act 5 on the receipt paper. By executing the information processing shown in FIG. 2 by the processor 11, the computer having the processor 11 as the central portion functions as a second control module.

In Act 8, the processor 11 instructs the printing unit 15 to cut the receipt paper. Here, the printing unit 15 performs printing while feeding a receipt paper wound into a roll shape. The printing unit 15 includes a cutter for cutting off a part of a tip side of the receipt paper from a part wound into the roll shape. If a cutting instruction is issued from the processor 11 as described above, the printing unit 15 operates the above cutter to cut off an area of the receipt paper in which the receipt image and the code symbol are printed. As a result, a receipt is issued in a state in which the receipt image and the code symbol are respectively printed on a cut receipt paper.

Figure 3:
FIG. 3 is a diagram illustrating an example of a layout of a receipt.

FIG. 3 is a diagram illustrating an example of a layout of a receipt RE1.

As described above, the receipt image is first printed and then a code symbol is printed. Therefore, in the receipt RE1, a receipt image IM1 is shown on the tip side and a code symbol SY1 is shown on the rear end side. A logo LO1 in the receipt image IM1 is printed based on the image data included in the print data. The other character strings in the receipt image IM1 is printed based on the text data included in the print data.

In Act 9, the processor 11 deletes the print data, the image receipt data, and the text receipt data stored in the main memory 12, respectively. After that, the processor 11 returns to the standby state in Act 1.

A customer starts an application of a code reader corresponding to a format of the code symbol SY1 in any information terminal such as a smartphone or a tablet terminal to read the code symbol SY1. The information terminal analyzes the image data obtained by photographing the code symbol SY1 using a camera and obtains data indicated by the code symbol SY1. The application of the code reader may be a general-purpose application. When many general-purpose code readers read a code symbol indicating data in the CSV format, a character string shown therein is displayed on a display device.

FIG. 4 is a diagram illustrating an example of a screen SC1 displayed on the display device of the information terminal when the code symbol SY1 is read.

The screen SC1 shows only character strings indicated based on the text data included in the print data on the receipt RE1.

As described above, according to the receipt printer 10, since the text receipt data can be transmitted to the information terminal that the customer possesses through the printing operation, as compared with a conventional electronic receipt service provided by using the electronic receipt server or the like, the electronic receipt service can be provided at a lower cost.

Since the receipt printer 10 receives the request for printing the paper receipt only from the POS terminal 20, the POS terminal 20 may be the existing device not compatible with the electronic receipt service without any change. In other words, in an existing POS system, it is possible to provide the electronic receipt service by simply replacing the existing receipt printer with the receipt printer 10 in the present embodiment.

Since the text receipt data includes text data indicating the character string, the text receipt data can be suitably used in a household accounting application or the like, for example. Since the text receipt data does not include the image data, an amount (size) of data thereof can be kept small. Therefore, the text receipt data can be shown as a printable code symbol on the receipt paper.

The receipt printer 10 prints the code symbol at an end of the receipt. For this reason, the customer can easily determine a type of the text receipt data relating to a transaction indicated by the code symbol.

The embodiment can be modified as follows.

The processor 11 may issue a cutting instruction prior to the start of printing of the code symbol in Act 7 after the printing of the receipt image in Act 6 is completed. In other words, a paper on which the receipt image is printed and a paper on which the code symbol is printed may be separately issued.

In place of the POS terminal 20, the receipt printer 10 may be used by being connected to an electronic cash register or the like.

The firmware or the application program indicating the information processing shown in FIG. 2 may be stored in the main memory 12 in advance before retail of the hardware of the receipt printer 10 is retailed, or may be provided separately from the retail of the hardware. In the latter case, the firmware or the application program may be provided by being recorded on a removable recording medium such as a magnetic disk, a magneto-optical disk, an optical disk, a semiconductor memory, etc., or via a network. In the latter case, the firmware or the application program may be provided as a version upgrade program to be used by being written in the main memory 12 and replaced with another information processing program of the same type already stored in the main memory 12.

A part or all of the functions performed by the processor 11 executing the information processing may be performed by hardware for executing an information processing not based on a program, such as a logic circuit or the like. The above-described functions may also be performed by combining the software control with the hardware such as the above-described logic circuit.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A receipt printer comprising:
a printing device;
a communication interface configured to receive print data including text data and image data; and
a processor configured to:
  generate text receipt data representative of the text data included in the print data received by the communication interface, by extracting the text data from the received print data, the text receipt data containing text description of one or more purchased commodities and purchased price;
  generate code symbol data corresponding to an optically-readable code symbol indicative of the text receipt data, based on the text receipt data generated from the received print data; and
  control the printing device to print a receipt image on a receipt sheet based on the print data received by the communication interface and the optically-readable code symbol on the receipt sheet based on the code symbol data.

2. The receipt printer according to claim 1, wherein the printing device includes a cutter, and
the processor is further configured to control the printing device to cut off a portion of a sheet on which the receipt image and the optically-readable code symbol are printed, as the receipt sheet.

3. The receipt printer according to claim 1, wherein the processor controls the printing device to print the receipt image and then the optically-readable code symbol.

4. The receipt printer according to claim 1, wherein the processor controls the printing device to print the receipt image on the receipt sheet after the processor generates the code symbol data.

5. The receipt printer according to claim 1, wherein the text receipt data indicates at least one of a store name, a store location, a store telephone number, a transaction date, a product name, and a product price.

6. The receipt printer according to claim 1, wherein the processor is further configured to store the text receipt data in memory, and delete the text receipt data stored in the memory after determining that the receipt image is printed on the receipt sheet.

7. The receipt printer according to claim 1, wherein the processor is further configured to store the text receipt data in memory, and delete the text receipt data stored in the memory after determining that the optically-readable code symbol is printed on the receipt sheet.

8. The receipt printer according to claim 1, wherein the text receipt data include no non-text image data.

9. The receipt printer according to claim 1, wherein the processor is configured to exclude text data of a predetermined attribute from the print data received by the communication interface to generate the text receipt data.

10. The receipt printer according to claim 1, wherein the processor generates the text receipt data in a predetermined format.

11. An operation method of a receipt printer comprising:
receiving print data including text data and image data through a communication interface;
generating text receipt data representative of the text data included in the received print data, by extracting the text data from the received print data, the text receipt data containing text description of one or more purchased commodities and purchased price;
generating code symbol data corresponding to an optically-readable code symbol indicative of the text receipt data, based on the text receipt data generated from the received print data; and
printing a receipt image on a receipt sheet based on the print data received by the communication interface and the optically-readable code symbol on the receipt sheet based on the code symbol data.

12. The operation method according to claim 11, further comprising:
cutting off a portion of a sheet on which the receipt image and the optically-readable code symbol are printed, as the receipt sheet, with a cutter of the receipt printer.

13. The operation method according to claim 11, wherein the optically-readable code symbol is printed on the receipt sheet after the receipt image is printed thereon.

14. The operation method according to claim 11, wherein the receipt image is printed on the receipt sheet after the code symbol data is generated.

15. The operation method according to claim 11, wherein the text receipt data indicates at least one of a store name, a store location, a store telephone number, a transaction date, a product name, and a product price.

16. The operation method according to claim 11, further comprising:
storing the text receipt data in memory; and deleting the text receipt data stored in the memory after determining that the receipt image is printed on the receipt sheet.

17. The operation method according to claim 11, further comprising:
    storing the text receipt data in memory; and
    deleting the text receipt data stored in the memory after determining that the optically-readable code symbol is printed on the receipt sheet.

18. The operation method according to claim 11, wherein the text receipt data include no non-text image data.

19. The operation method according to claim 11, further comprising:
    excluding text data of a predetermined attribute from the print data received by the communication interface to generate the text receipt data.

20. The operation method according to claim 11, wherein the text receipt data is generated in a predetermined format.

* * * * *